(12) United States Patent
Kitamura et al.

(10) Patent No.: US 7,122,818 B2
(45) Date of Patent: Oct. 17, 2006

(54) OPTICAL DISPLACEMENT SENSOR USING OPTICAL FIBER, AND EXTERNAL FORCE DETECTING DEVICE

(75) Inventors: Atsushi Kitamura, Shizuoka-ken (JP); Shigeyuki Adachi, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 37 days.

(21) Appl. No.: 10/990,200

(22) Filed: Nov. 16, 2004

(65) Prior Publication Data

US 2005/0116151 A1 Jun. 2, 2005

(30) Foreign Application Priority Data

Nov. 27, 2003 (JP) .............................. 2003-397799

(51) Int. Cl.
| | |
|---|---|
| G01N 21/86 | (2006.01) |
| G01J 1/04 | (2006.01) |
| G01D 5/34 | (2006.01) |
| G01B 9/02 | (2006.01) |
| G01B 11/02 | (2006.01) |

(52) U.S. Cl. ........................... 250/559.32; 250/227.11; 250/231.18; 356/482; 356/498

(58) Field of Classification Search ........... 250/231.14, 250/231.16, 231.17, 559.29, 559.32, 231.18, 250/227.11; 356/460, 482, 498
See application file for complete search history.

(56) References Cited

U.S. PATENT DOCUMENTS 4,342,907 A * 8/1982 Macedo et al. ........ 250/227.14
4,893,930 A * 1/1990 Garrett et al. .............. 356/477

FOREIGN PATENT DOCUMENTS

JP 3-245028 10/1991

* cited by examiner

*Primary Examiner*—Georgia Epps
*Assistant Examiner*—Pascal M. Bui-Pho
(74) *Attorney, Agent, or Firm*—Muirhead and Saturnelli, LLC (57) ABSTRACT

An optical displacement sensor is provided, in which an optical fiber is disposed between a light source and a light receiving means so that light emitted from the light source is conducted therethrough so as to be duly received by the light receiving means whereby a beam diameter can be controlled and a uniform intensity distribution of emitted light can be ensured without providing a pinhole aperture. Also, a six-axis force sensor incorporating such an optical displacement sensor is provided.

3 Claims, 6 Drawing Sheets

OPTICAL DISPLACEMENT SENSOR USING OPTICAL FIBER, AND EXTERNAL FORCE DETECTING DEVICE

BACKGROUND OF THE INVENTION

1. Field of the Invention

The present invention relates to an optical displacement sensor and an external force detecting device, and particularly to an optical displacement sensor which detects relative displacement between a reference object and a measurement object based on displacement of a light reception position, and further to an external force detecting device which detects an external force applied to the measurement object based on a signal outputted from the optical displacement sensor.

2. Description of the Related Art

An external force detecting device, such as a six-axis optical force sensor, is conventionally known, in which a displacement amount of an action section to receive an external force, namely a measurement object, relative to a support section to support the action section, namely a reference object, is detected by an optical displacement sensor, and the external force received at the action section is measured according to an output signal from the optical displacement sensor.

For example, a six-axis optical force sensor comprises optical displacement sensors to measure a six-axis direction displacement, based on which a six-axis force is calculated. Specifically, such a six-axis optical force sensor comprises three optical displacement sensors, each of which uses an optical sensor unit and is capable of measuring a two-axis (X and Y) direction displacement, and which in combination enable measurement of a six-axis direction displacement. The optical displacement sensor comprises a light emitting diode (LED) as a light source and a photodiode (PD) assembly as a light receiving element, such that the LED opposes the PD assembly with their respective optical center axes aligned to each other. The PD assembly is composed of four PD's and receives light emitted from the LED at its center area equally shared by the four PD's, whereby displacement of light receiving position at the PD assembly, that is to say relative positional displacement between a component attached to the LED and a component attached to the PD assembly can be detected in the optical displacement sensor. In the six-axis optical force sensor, a six-axis force applied between the component attached to the LED and the component attached to the PD assembly is measured according to an output signal from each of the optical displacement sensors.

Figure 1:
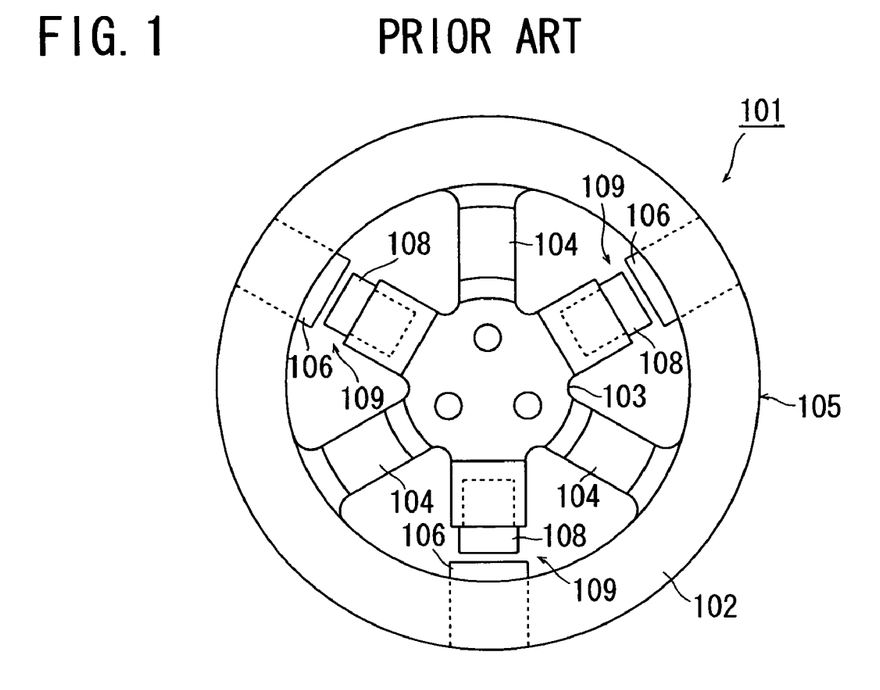
FIG. 1 is a top plan view of a main body of a conventional six-axis force sensor.

FIG. 1 is a plan view of a main body of a conventional six-axis optical force sensor 101 as disclosed in, for example, Japanese Patent Application Laid-Open No. H03-245028. The six-axis force sensor 101 is basically composed of the aforementioned main body shaped cylindrical, and top and bottom lids which are not shown in the figure. Referring to FIG. 1, the main body is constituted basically by a frame 105, which integrally includes: a cylindrical support section 102; an action section 103 located centrally inside the support section 102 and adapted to receive an external force; and three elastic spoke sections 104 crookedly structured so as to be elastically deformed for an appropriate displacement amount corresponding to a force to be measured and supportably connecting the action section 103 to the support section 102. The frame 105 is made of a single piece of an aluminum alloy material and shaped by cutting and electric discharge machining. The support section 102 and the action section 103 are fixedly attached respectively to two components to which a measurement force is applied, and when a force applied acts on the six-axis force sensor 101 structured as described above, a micro-displacement with respect to three-axis direction and a micro-rotation with respect to three-axis rotational direction are generated between the support section 102 and the action section 103.

The six-axis force sensor 101 further includes three light sources 106 disposed at the inner circumference of the support section 102 at 120 degree intervals (i.e. at an equi-angular distance), and three optical sensors (light receiving elements) 108 disposed at the action section 103 at 120 degree intervals (i.e. at an equi-angular distance) so as to oppose respective three light sources 106 with mutual optical axes aligned to each other. Each optical sensor 108 and each light source 106 disposed opposite to the optical sensor 108 make up an optical displacement sensor 109.

Figure 2:
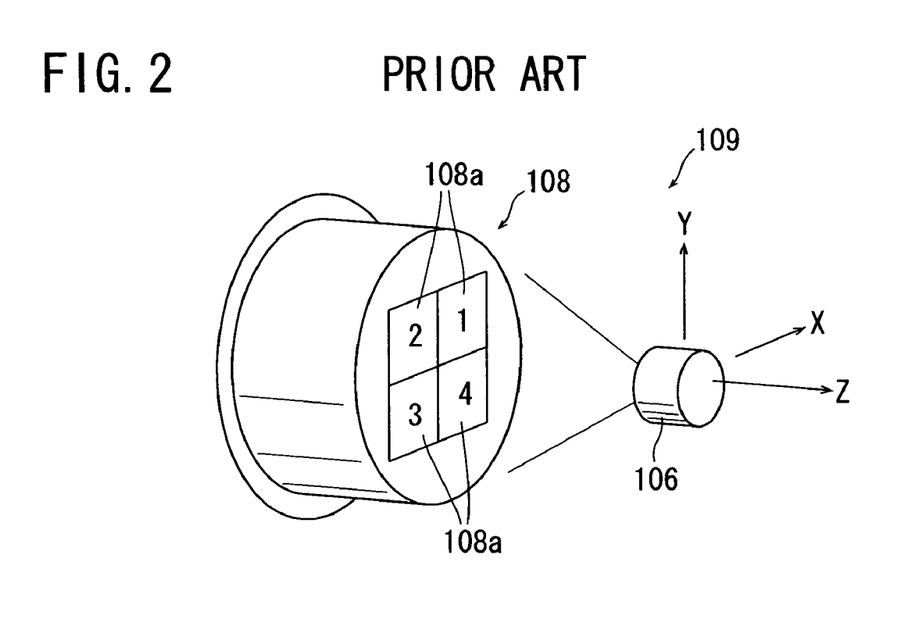
FIG. 2 is an explanatory perspective view of a conventional optical displacement sensor shown in FIG. 1.

FIG. 2 is an explanatory perspective view of the optical displacement sensor 109 of FIG. 1. As shown in FIG. 2, each of the optical sensors 108 is constituted by a PD assembly composed of four PD's 108a. The light sources 106 disposed so as to oppose respective optical sensors 108 are each constituted by an infrared high-intensity LED with a pinhole aperture provided at its front face, and light emitted from the LED 106 and passing through the pinhole aperture propagates diffusedly and impinges on the center portion of the optical sensor 108 so as to be substantially equally irradiated on all the four PD's 108a. If the support section 102 and the action section 103 are displaced relative to each other by an external force, then the light emitted from the LED 106 is irradiated unequally on the four PD's 108a, and light amounts received at respective four PD's 108a are measured for calculation of relative displacements with respect to X- and Y-axis directions. And, the six-axis force sensor 101 calculates forces with respect to six-axis directions according to the above-calculated relative displacements, and a signal is outputted therefrom.

As described above with reference to FIGS. 1 and 2, the conventional six-axis optical force sensor 101 comprises: the frame 105 which includes elastic spoke sections 104 structured so as to be elastically deformed by an applied force to be measured; and three of the optical displacement sensors 109 each of which consists of the optical sensor 108 adapted to detect the displacement according to the deformation, and the light source 106.

However, the aforementioned conventional optical displacement sensor, and the aforementioned six-axis force sensor (i.e., external force detecting device) incorporating the conventional optical displacement sensor has the following problems.

In the optical displacement sensor disclosed in the aforementioned Japanese Patent Application Laid-Open No. H03-245028, light emitted from an LED passes through a pinhole aperture provided at the front face of the LED, propagates diffusedly and impinges on an optical sensor as described above. The pinhole aperture operates to ensure a uniform intensity distribution of light emitted as well as control the diameter of a light beam. Since electrodes and wires are usually disposed toward a light emitting face of an LED tip, the light emitted from the LED is apt to incur a non-uniform intensity distribution as a whole. This is one reason the pinhole aperture adapted to ensure a uniform light intensity distribution is provided as described in the aforementioned Japanese Patent Application Laid-Open No. H03-245028. The pinhole aperture is positioned at an appropriate part of the light emitted from the LED, where a uniform light intensity distribution is secured.

Such a pinhole aperture, however, requires a high accuracy of processing, and therefore invites an increased cost as well as an increased number of components. Also, such a pinhole aperture structure inevitably reduces the amount of light to impinge on an optical sensor, and in order to compensate for reduction in the amount of light to impinge on an optical sensor, an increased current must be supplied to the LED thus inviting increased electric power consumption. This increased electric power consumption leads to an increase of heat generation, which has influence on the amount of light emitted from the LED therefore resulting in deteriorating measurement accuracy. And, in connection with the increased electric power consumption, since a conventional six-axis force sensor has three light sources (see FIG. 1), the problem of increase in electric power consumption is crucial.

SUMMARY OF THE INVENTION

The present invention has been made in view of the above problems, and it is an object of the present invention to provide a six-axis force sensor, in which the diameter of a light beam can be controlled and a uniform intensity distribution of emitted light can be secured without providing a pinhole aperture structure.

In order to achieve the above object, according to a first aspect of the present invention, an optical displacement sensor comprises: a light source disposed at one of a reference object and a measurement object; a light receiving means which is disposed at the other one thereof not having the light source, and which receives light emitted from the light source thereby measuring displacement of the measurement object relative to the reference object with respect to two-axis directions in a plane perpendicular to an optical center axis of the light emitted from the light source; and an optical fiber which is disposed between the light source and the light receiving means in such a manner as to keep its relative position steady with respect to the light source, and which conducts the light emitted from the light source so that the light can be received by the light receiving means. Consequently, a beam diameter can be duly controlled, and non-uniformity of intensity distribution of light emitted from the light source can be alleviated while the light travels through the optical fiber, thus eliminating the necessity of a pinhole aperture. Also, since light exiting out from the optical fiber has a smaller diffusing angle (12 degrees, for example) than light emitted from the light source such as an LED (120 degrees, for example), a light beam is allowed to impinge on the light receiving face of the light receiving means with a minute diameter (the distance between the light exit end of the optical fiber and the light receiving face of the light receiving means is set to about 0.5 mm), whereby the ratio of the output variation of the light receiving means to the displacement (change in reception position) amount of the light beam is increased, thus enhancing precision in detecting displacement.

In the first aspect of the present invention, a lens to condense the light emitted from the light source on an entrance facet of the optical fiber may be provided between the light source and the optical fiber. Consequently, the light emitted from the light source can be used effectively, thus contributing to reduction in power consumption.

In the first aspect of the present invention, the optical fiber may be a single-mode fiber. Consequently, when an optical fiber having a small diameter (for example, 10 μm) is used, a planar light source such as an LED (usually having an emission diameter of 330 μm or larger) can work as a pseudo-point light source.

According to a second aspect of the present invention, an external force detecting device includes at least one optical displacement sensor structured as recited in the first aspect, in which an external force applied to the measurement object is detected based on a signal of measurement results by the optical displacement sensor. Consequently, the external force detecting device has the above-described advantages that are gained by the optical displacement sensor according to the first aspect of the present invention.

In the second aspect of the present invention, a plurality of optical displacement sensors may be provided such that the two-axis directions with respect to which displacement is measured differ among the optical displacement sensors, and the plurality of optical displacement sensors may share one light source in common, with one optical fiber branching into a number equal to a number of light receiving means. Consequently, the number of light sources can be reduced to one for provision of a plurality of optical displacement sensors, which means reduction in power consumption as well as a decreased number of components.

According to the present invention, since the optical fiber has a beam divergence angle (for example, 12 degrees) smaller than that of LED (for example, 120 degrees) thus allowing the light beam to be received at the light receiving face of a PD assembly with a minute diameter (the distance between the light emitting end of the optical and the light receiving face of the PD assembly is set to about 0.5 mm), the output variation ratio of the PD assemble with respect to the displacement amount (travel distance) of the light beam is increased resulting in an enhanced precision of displacement detection.

DETAILED DESCRIPTION OF THE PREFERRED EMBODIMENTS

Preferred embodiments of the present invention will hereinafter be described with reference to the accompanying drawings. In the embodiments described below, an optical displacement sensor according to the present invention is applied to such a six-axis optical force sensor as shown in FIG. 1, but the present invention is not limited to application to an external force detecting device for detecting six-axis force.

Figure 3:
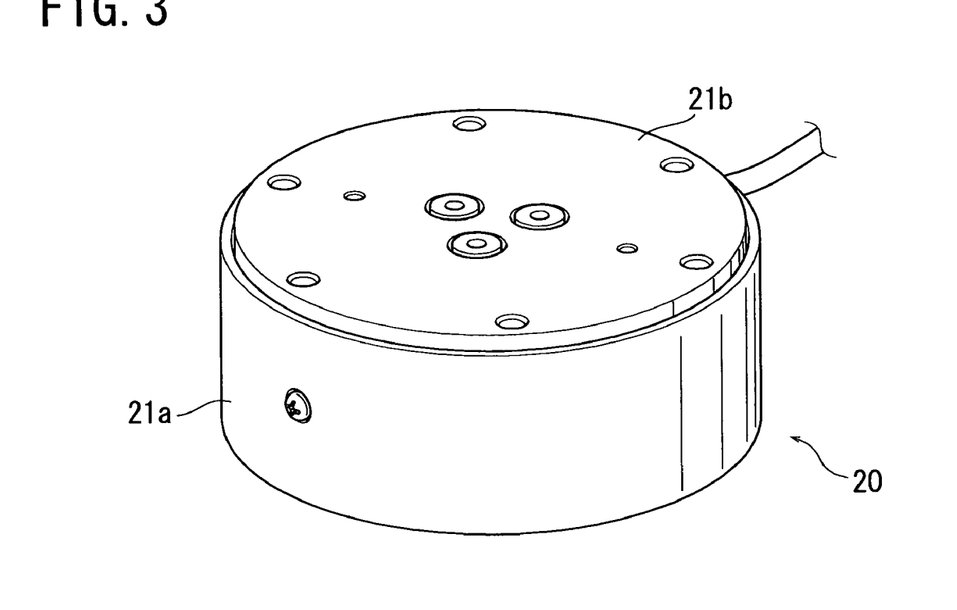
FIG. 3 is a perspective view of a six-axis force sensor according to a first embodiment of the present invention.
Figure 4:
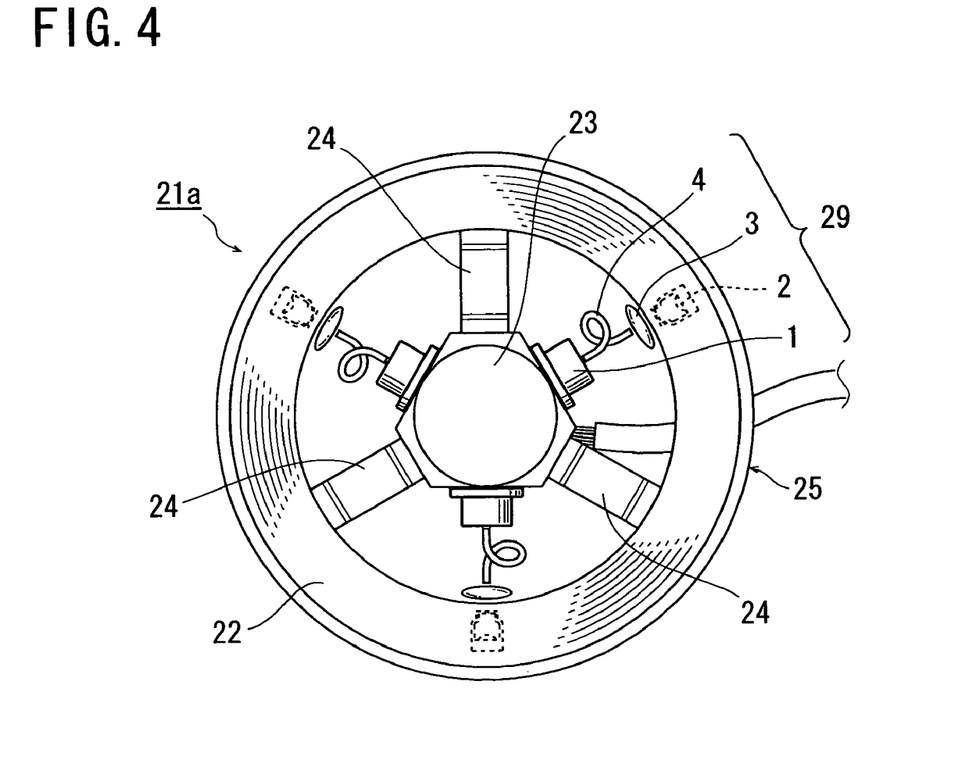
FIG. 4 is a top plan view of a main body of the six-axis force sensor of FIG. 3.

One embodiment of the present invention will hereinafter be described with reference FIGS. 3 to 7. Referring first to FIG. 3, a six-axis force sensor 20 according to a first embodiment is structurally composed of a cylindrical main body 21a, a disk-like top lid 21b, and a disk-like bottom lid (not seen). Referring now to FIG. 4, the main body 21a is constituted basically by a frame 25, which integrally includes: a cylindrical support section 22; an action section 23 disposed centrally inside the support section 22 and adapted to receive an external force; and three elastic spoke sections 24 crookedly structured so as to readily provide elastic deformation in all directions and supportably connecting the action section 23 to the support section 22. The frame 25 is made of a single piece of an aluminum alloy material and shaped by cutting and electric discharge machining. The support section 22 and the action section 23 are fixed respectively to two components to which a measurement force is applied, and when the applied force acts on the six-axis force sensor 20 structured as described above, micro-displacements with respect to three-axis directions and micro-rotations with respect to rotational directions thereabout are generated between the support section 22 and the action section 23.

Referring again to FIG. 4, the support section 22 has three light sources (LED's, for example) 2 disposed at its inner circumference at 120 degree intervals (i.e. at an equi-angular distance), and three lenses 3 and three optical fibers 4 are arranged at 120 degree intervals (i.e. at an equi-angular distance) at positions corresponding to the three light sources 2, respectively. The lens 3 may be, for example, an aspheric plastic lens. The optical fiber 4 is preferably put with the light source 2 and the lens 3 in an integral structure in order to keep its relative position steady with respect thereto. Meanwhile, the action section 23 has three optical sensors (light receiving elements: PD assemblies, for example) 1 disposed at 120 degree intervals (i.e. at an equi-angular distance) corresponding to the three optical fibers 4, respectively. Each of the optical sensors 1, the light sources 2, the lenses 3, and the optical fibers 4 constitute an optical displacement sensor 29. One end (light outlet) of the optical fiber 4 is positioned to oppose the optical sensor 1, and light emitted from the light source 2 is condensed by the lens 3, impinges on the other end (light entrance) of the optical fiber 4, travels therethrough, exits out from the light outlet thereof, and irradiates the center of the light receiving face of the optical sensor 1.

Figure 5:
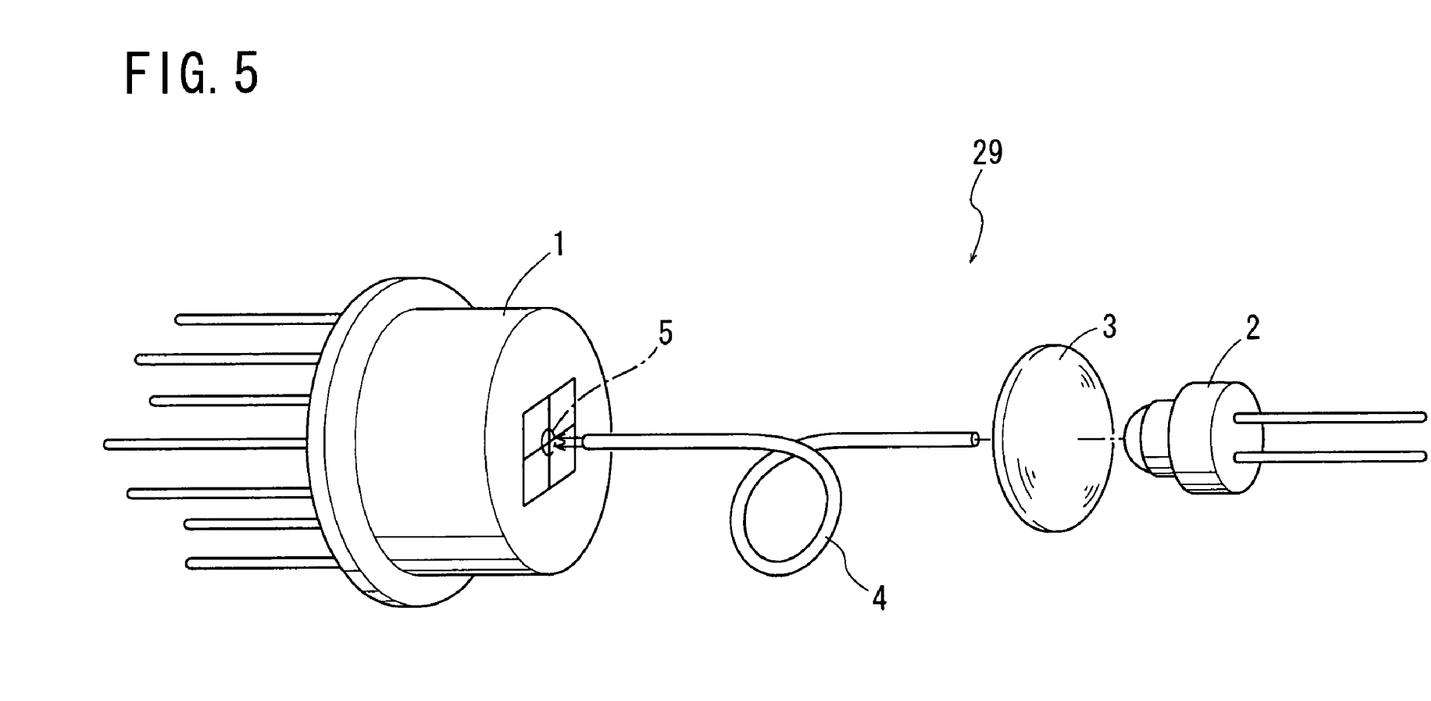
FIG. 5 is an explanatory perspective view of one optical displacement sensor shown in FIG. 4.

Referring to FIG. 5, each optical displacement sensor 29 according to the first embodiment comprises: a PD assembly, that is a light receiving means as the optical sensor 1; an LED, that is a light emitting element as the light source 2; the lens 3 to condense light emitted from the LED 2; and the optical fiber 4, into which the light condensed by the lens 3 is introduced, and from which the light introduced exits out as a light beam 5 so as to irradiate the center of the light receiving face of the PD assembly 1. The distance between the light outlet of the optical fiber 4 and the light receiving face of the PD assembly 1 is set to, for example, about 0.5 mm.

In the optical displacement sensor 29, the PD assembly 1 is disposed at one of a reference object and a measurement object, and the LED 2 is disposed at the other one thereof at which the PD assembly 1 is not disposed, wherein light emitted from the LED 2 is received by the PD assembly 1 via the lens 3 and the optical fiber 4 as described above, and according to the state of the light received by the PD assembly, the displacement of the measurement object relative to the reference object can be measured with respect to two-axis direction in a surface perpendicular to the center axis of the light exiting out from the optical fiber 4. This operation is common to another embodiment to be described later with reference to FIGS. 8, 9 and 10.

Figure 6:
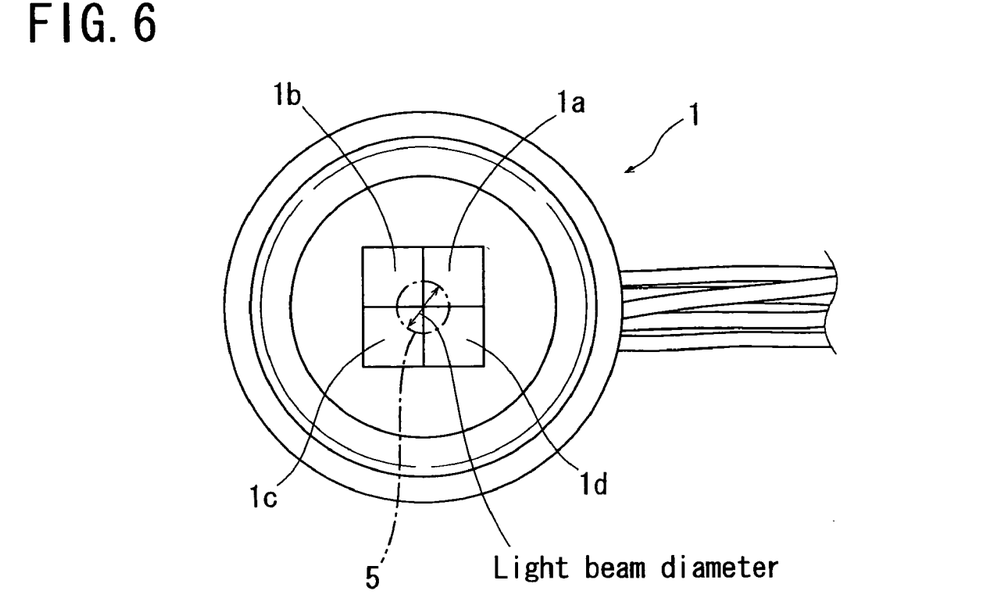
FIG. 6 is a plan view of a light receiving face of a PD assembly shown in FIG. 5.

FIG. 5 shows that the light receiving face of the PD assembly 1 consists of four sections. This will be further described by referring to FIG. 6. As shown in FIG. 6, the PD assembly 1 comprises four PD's 1a to 1d, and the light beam 5 (see FIG. 5) impinges on the PD's 1a to 1d. It is preferable that the center axis of the light beam 5 be perpendicular to the light receiving face of the PD assembly and be positioned at the center of the four PD's 1a to 1d.

Figure 7:
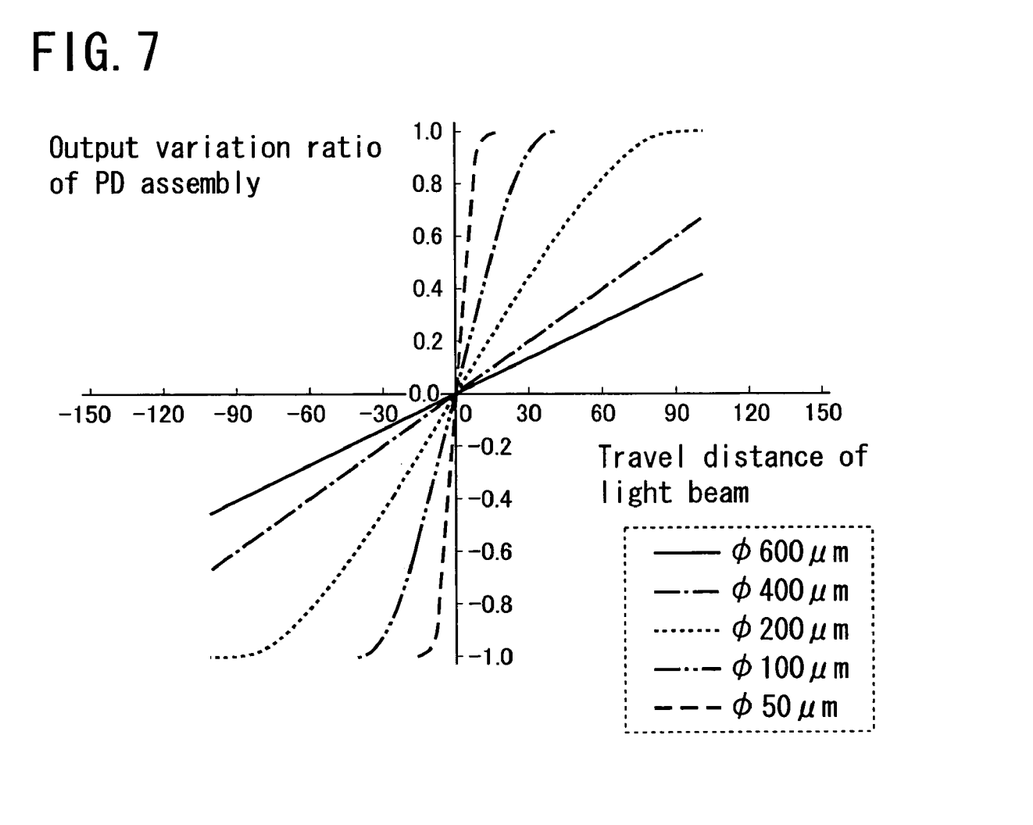
FIG. 7 is a graph showing a relation between change in position (travel distance) of a light beam at the light receiving face of the PD assembly and variation ratio of output by the PD assembly when the diameter of the light beam at the light receiving face of the PD assembly is changed.

A relation between the diameter of the light beam 5 and the variation of an output of the PD's 1a to 1d will be described with reference to FIG. 7. In FIG. 7, the horizontal axis represents the travel distance of the light beam 5, and the vertical axis represents the variation ratio of the output. Specifically, the travel distance is defined by the light beam 5 traveling in the horizontal direction (in FIG. 7) on the light receiving face of the PD assembly 1, and the variation ratio of the output is defined by a formula: $\{(A+D)-(B+C)\}/(A+B+C+D) \times 100\%$ where A, B, C, and D are light intensities detected by the PD's 1a, 1b, 1c and 1d, respectively. FIG. 7 shows five measurement results with the diameter of the light beam 5 set at 600 µm, 400 µm, 200 µm, 100 µm, and 50 µm, respectively.

As seen from FIG. 7, with a smaller diameter of the light beam 5, the output varies more sharply in response to a given amount of travel distance, namely, change in position, of the light beam 5, thus indicating that the light beam 5 with a smaller diameter works more effectively. The diameter of the light beam 5 can be reduced by setting a small diameter on the optical fiber 4 (for example, a single-mode fiber having a diameter of 10 µm). Thus, the LED 2 as a planar light source is adapted to work as a pseudo-point light source thereby realizing a reduced diameter. Also, since light exiting out from the optical fiber 4 has a smaller diffusing angle (12 degrees, for example) than light emitted from the LED 2 (120 degrees, for example), a light beam is allowed to impinge on the light receiving face of the PD assembly 1 with a minute diameter (the distance between the light exit end of the optical fiber 4 and the light receiving face of the PD assembly 1 is set to about 0.5 mm).

Figure 8:
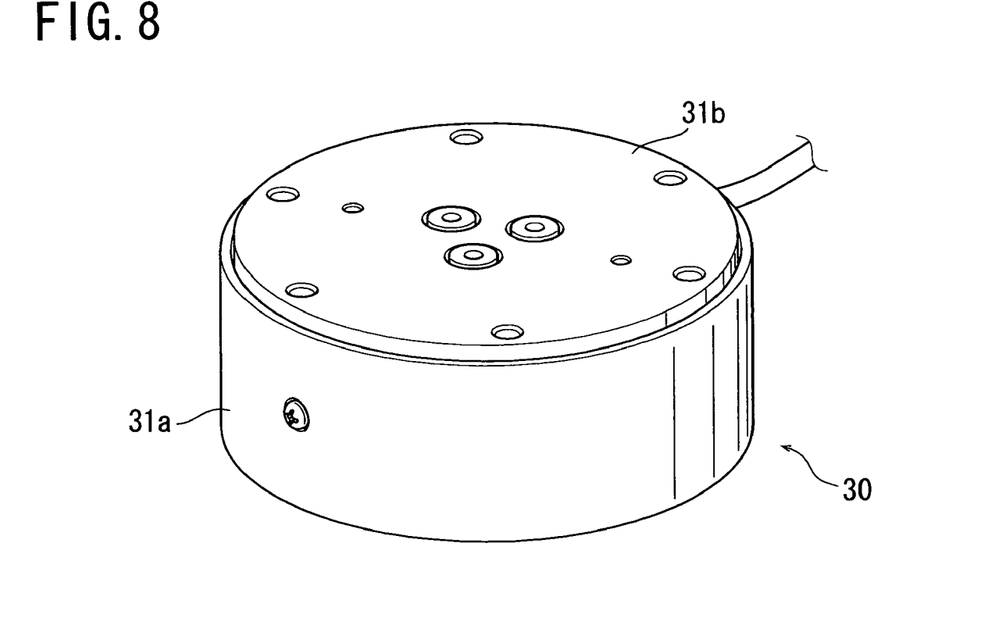
FIG. 8 is a perspective view of a six-axis force sensor according to a second embodiment of the present invention.
Figure 9:
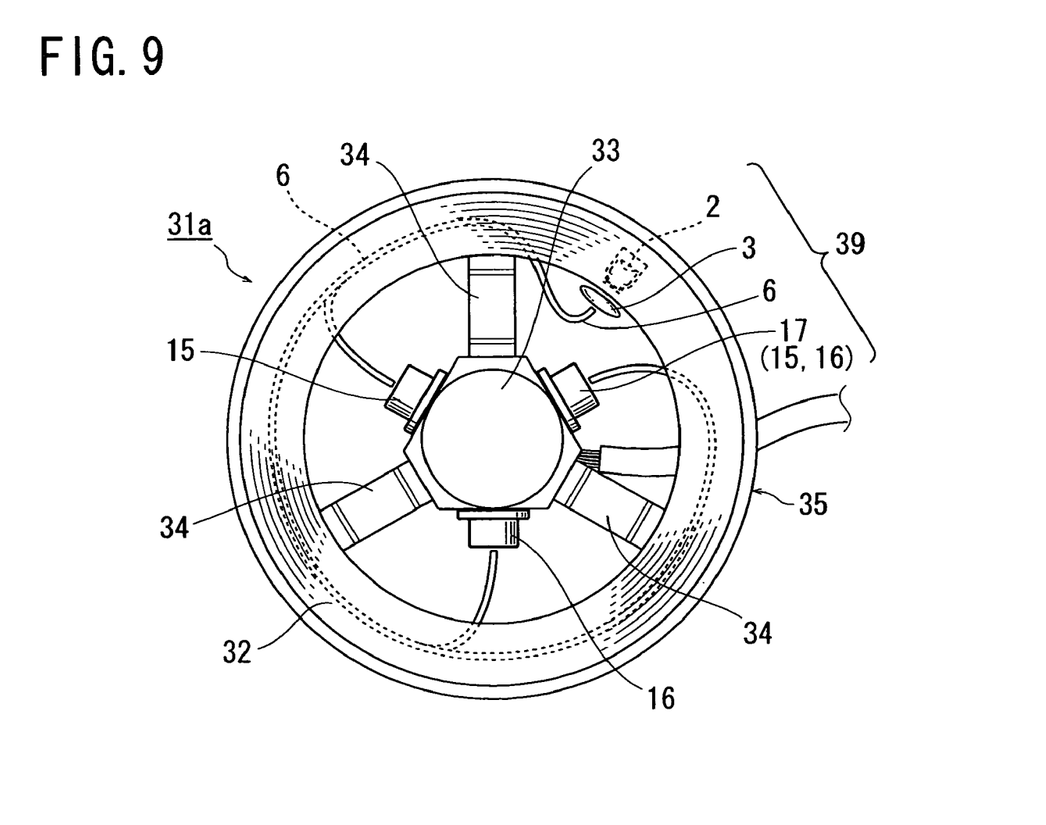
FIG. 9 is a top plan view of a main body of the six-axis force sensor of FIG. 6.

Another embodiment of the present invention will be described with reference to FIGS. 8 to 10. Referring first to FIG. 8, a six-axis force sensor 30 according to a second embodiment is structurally composed of a cylindrical main body 31a, a disk-like top lid 31b, and a disk-like bottom lid (not seen). Referring now to FIG. 9, the main body 31a is constituted basically by a frame 35, which integrally includes: a cylindrical support section 32; an action section 33 disposed centrally inside the support section 32 and adapted to receive an external force; and three elastic spoke sections 34 crookedly structured so as to readily provide elastic deformation in all directions and supportably connecting the action section 33 to the support section 32. The frame 35 is made of a single piece of an aluminum alloy material and shaped by cutting and electric discharge machining. The support section 32 and the action section 33 are fixed respectively to two components to which a measurement force is applied, and when the applied force acts on the six-axis force sensor 30 structured as described above, micro-displacements with respect to three-axis directions and micro-rotations with respect to rotational directions thereabout are generated between the support section 32 and the action section 33.

Referring again to FIG. 9, one light source (an LED, for example) 2 is disposed at an arbitrary position of the inner circumference of the support section 22, and one lens 3 and one optical fiber 6 are arranged at a position corresponding to the light source 2. The lens 3 may be, for example, an aspheric plastic lens. The optical fiber 6 is trifurcated so as to have one light entrance, and three light outlets preferably set with the light source 2 and the lens 3 in an integral structure. Light condensed by the lens 3 impinges on the light entrance of the optical fiber 6, travels therethrough, and exits out from the three light outlets. The three light outlets are arranged at 120 degree intervals (i.e. at an equi-angular distance). Meanwhile, the action section 33 has three optical sensors (light receiving elements: PD assemblies, for example) 15, 16 and 17 disposed at 120 degree intervals (i.e. at an equi-angular distance) corresponding respectively to the three light outlets of the trifurcated optical fiber 6. The optical sensors 15, 16 and 17, the light source 2, the lens 3, and the optical fiber 6 constitute a triple optical displacement sensor 39. The three light outlets of the optical fiber 6 are positioned to oppose the optical sensors 15, 16 and 17, respectively, and light emitted from the light source 2 is condensed by the lens 3, impinges on the light entrance of the optical fiber 6, travels therethrough, then branches into three ways, each exiting out from each of the three light outlets thereof so as to irradiate the center of the light receiving face of each of the optical sensors 15, 16 and 17.

Figure 10:
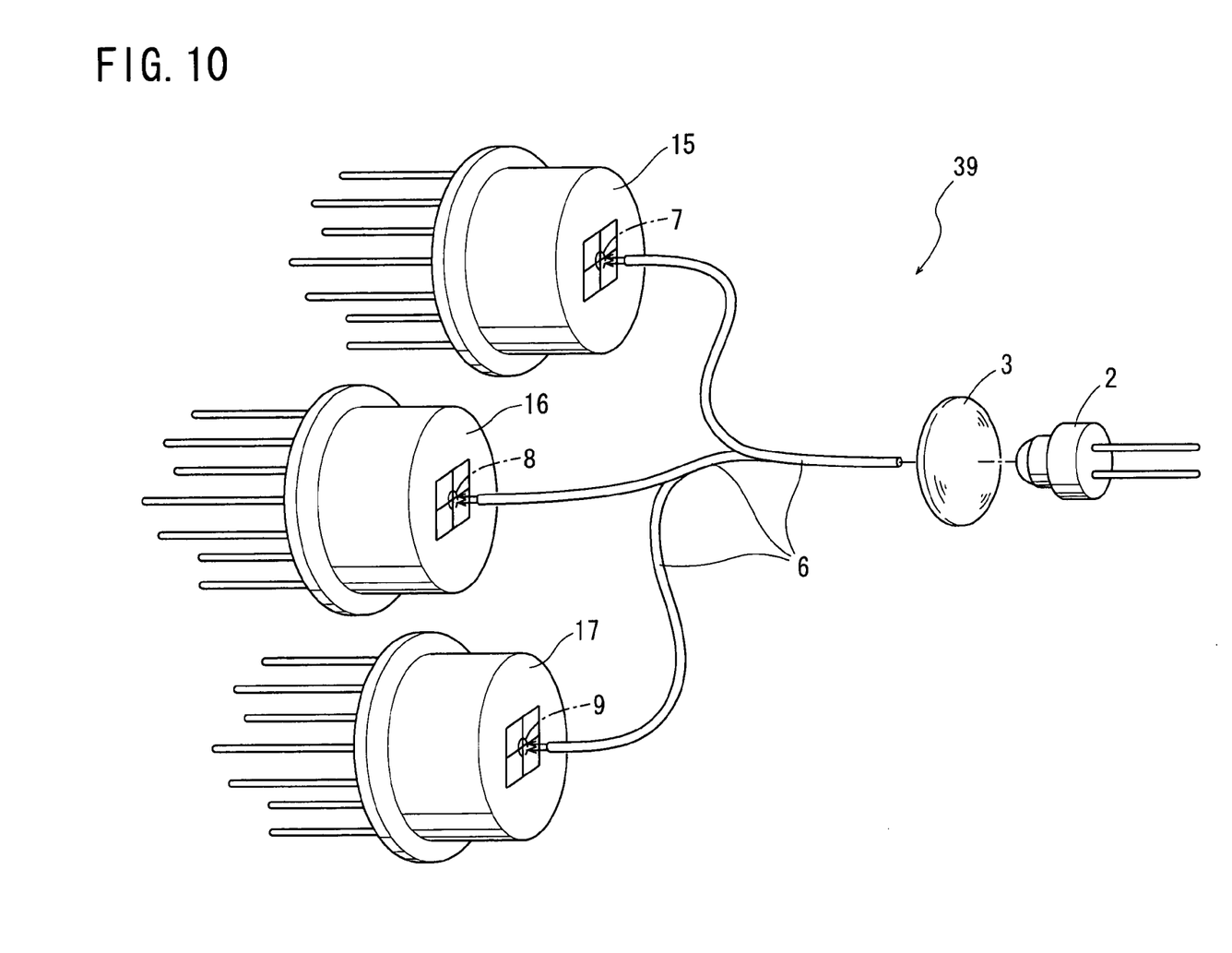
FIG. 10 is an explanatory perspective view of optical displacement sensors shown in FIG. 7.

Referring to FIG. 10, the optical displacement sensor 39 according to the second embodiment comprises: three PD assemblies, that are light receiving means as the optical sensors 15, 16 and 17; an LED, that is a light emitting element as the light source 2; the lens 3 to condense light emitted from the LED 2; and the trifurcated optical fiber 6 having one light entrance and three light outlets, wherein the light condensed by the lens 3 is introduced from the light entrance, and branches into three ways, and the branched lights exit out from respective light outlets as light beams 7, 8 and 9 so as to irradiate the centers of the light receiving faces of the PD assemblies 15, 16 and 17. The distance between the light outlets of the optical fiber 6 and the respective light receiving faces of the PD assemblies 15, 16 and 17 is set to, for example, about 0.5 mm.

In the second embodiment described above, a further advantage is provided that only one light source, together with one lens, is required rather than three.

While the present invention has been illustrated and explained with respect to specific embodiments thereof, it is to be understood that the present invention is by no means limited thereto but encompasses all changes and modifications that will become possible within the scope of the appended claims.

What is claimed is:

1. An external force detecting device, comprising:
  a plurality of optical displacement sensors, at least one of said plurality of optical displacement sensors including:
  a light source disposed at one of a reference object and a measurement object;
  a light receiving means disposed at the other one thereof at which the light source is not disposed, and functioning to receive light emitted from the light source thereby measuring displacement of the measurement object relative to the reference object with respect to two-axis directions in a plane perpendicular to an optical center axis of the light emitted from the light source; and
  an optical fiber disposed between the light source and the light receiving means in such a manner as to keep its relative position steady with respect to the light source, the optical fiber functioning to conduct the light, emitted from the light source so that the light can be received by the light receiving means,
  wherein an external force applied to the measurement object is detected based on a signal of measurement results by the optical displacement sensor, and
  wherein said plurality of optical displacement sensors are provided such that the two-axis directions with respect to which displacement is measured differ among the optical displacement sensors, and wherein the plurality of optical displacement sensors share one light source in common, with one optical fiber branching into a number equal to a number of light receiving means.

2. The external force detecting device according to claim 1,
  wherein said at least one optical displacement sensor further includes a lens provided between the light source and the optical fiber, the lens functioning to condense the light emitted from the light source on an entrance facet of the optical fiber.

3. The external force detecting device according to claim 1, wherein the optical fiber is a single-mode fiber.

* * * * *